US012615560B2

(12) United States Patent
Cui et al.

(10) Patent No.: US 12,615,560 B2
(45) Date of Patent: Apr. 28, 2026

(54) REFERENCE SELECTION FOR HANDOVER WITH PSCELL CHANGE OR ADDITION

(71) Applicant: Apple Inc., Cupertino, CA (US)

(72) Inventors: Jie Cui, San Jose, CA (US); Dawei Zhang, Saratoga, CA (US); Fangli Xu, Beijing (CN); Hong He, San Jose, CA (US); Huaning Niu, San Jose, CA (US); Manasa Raghavan, Sunnyvale, CA (US); Qiming Li, Beijing (CN); Seyed Ali Akbar Fakoorian, San Diego, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/777,155

(22) PCT Filed: Aug. 5, 2021

(86) PCT No.: PCT/CN2021/111023

§ 371 (c)(1),
(2) Date: Feb. 9, 2023

(87) PCT Pub. No.: WO2023/010460

PCT Pub. Date: Feb. 9, 2023

(65) Prior Publication Data

US 2024/0163738 A1     May 16, 2024

(51) Int. Cl.
*H04W 36/00*        (2009.01)
*H04W 36/08*        (2009.01)
*H04W 76/20*        (2018.01)

(52) U.S. Cl.
CPC . *H04W 36/0058* (2018.08); *H04W 36/00698* (2023.05); *H04W 36/08* (2013.01); *H04W 76/20* (2018.02)

(58) Field of Classification Search
CPC ....... H04W 36/0058; H04W 36/00698; H04W 36/08; H04W 36/0088; H04W 76/20
See application file for complete search history.

(56) References Cited

U.S. PATENT DOCUMENTS

2021/0029597 A1*  1/2021  Xu .................... H04W 36/0066
2021/0377824 A1   12/2021  Shi

FOREIGN PATENT DOCUMENTS

CN        110831042 A      2/2020
CN        112567655 A      3/2021
(Continued)

OTHER PUBLICATIONS

Huawei ("Discussion on remaining issues in Rel-15 NR RRM requirements", 3GPP Draft; R4-2110846, May 11, 2021, XP052009279) (Year: 2021).*

(Continued)

*Primary Examiner* — Jamal Javaid
(74) *Attorney, Agent, or Firm* — Eschweiler & Potashnik, LLC; Matthew Glause

(57)                ABSTRACT

Apparatus and method are provided for a user equipment (UE) to perform measurement operations for a handover procedure including target NR Primary Secondary Cell (PSCell) change or addition. The measurements of a target PSCell are performed in accordance with a synchronization signal/physical broadcast channel (SS/PBCH) block measurement time configuration (SMTC) included in a measurement object received from a base station (BS). A source primary cell (PCell) is used for reference timing of the SMTC if the measurement object is configured by the source PCell on same frequency and subcarrier spacing of the target PSCell. A source PSCell is used for reference timing of the
(Continued)

200

SMTC if the measurement object is configured by the source PSCell on same frequency and subcarrier spacing of the target PSCell.

19 Claims, 6 Drawing Sheets

(56)                    References Cited

FOREIGN PATENT DOCUMENTS

| | | |
|---|---|---|
| CN | 112930693 A | 6/2021 |
| WO | 2020/192227 A1 | 10/2020 |

OTHER PUBLICATIONS

International Preliminary Report on Patentability dated Feb. 6, 2024 in connection with Application Serial No. PCT/PCT/CN2021/111023.

PCT Search Report dated Mar. 14, 2022 in connection with PCT Application No. PCT/CN2021/111023.

PCT Written Opinion dated Mar. 23, 2022 in connection with PCT Application No. PCT/CN2021/111023.

Ericsson 3GPP TSG-RAN WG2 Meeting #112e R2-2009847 UE capability for configuration of SMTC of target SCG cell Oct. 22, 2020(Oct. 22, 2020).

Apple 3GPP TSG-RAN4 Meeting #99-e R4-2109309 on RRM requirement for handover with PSCell May 11, 2021 (May 11, 2021).

3GPP TSG-RAN WG2 Meeting #114-e R2-2106754 E-meeting, Clarification on the Timing Reference of PSCell SMTC Configuration; May 19-May 27, 2021.

3GPP TSG-RAN4 Meeting #99-e R4-2108344; Electronic Meeting, WF on further RRM enhancement for NR and MR- DC—HO with PSCell; May 19-27, 2021.

Universal Mobile Telecommunications System (UMTS); LTE; 5G; NR; Multi-connectivity; Overall description; Stage-2 (3GPP TS 37.340 version 16.5.0 Release 16); ETSI TS 137 340 V16.5.0 (Apr. 2021).

5G; NR; Requirements for support of radio resource management; (3GPP TS 38.133 version 16.7.0 Release 16); ETSI TS 138 133 V16.7.0 (Jun. 2021).

5G; NR; Radio Resource Control (RRC); Protocol Specification (3GPP TS 38.331 version 16.4.1 Release 16); ETSI TS 138 33 V16.4.1 (Apr. 2021).

European Extended Search Report dated Feb. 14, 2025 in connection with Application No. 21952346.1.

Huawei et al; "Discussion on remaining issues in Rel-15 NR RRM requirements"; 3GPP Draft; R4-2110846; May 19, 2021.

3rd Generation Partnership Project; Technical Specification Group Radio Access Network; NR; Radio Resource Control (RRC) protocol specification (Release 16); 3GPP TS 38.331 V16.5.0; Jun. 2021.

Qualcomm Incorporated; "Handling of SMTC configuration"; 3GPP TSG-RAN WG2; R2-1903752; Apr. 8, 2019.

* cited by examiner

REFERENCE SELECTION FOR HANDOVER WITH PSCELL CHANGE OR ADDITION

This application is a National Phase entry application of International Patent Application No. PCT/CN2021/111023 filed Aug. 5, 2021, entitled "REFERENCE SELECTION FOR HANDOVER WITH PSCELL CHANGE OR ADDITION", the contents of which are herein incorporated by reference in their entirety.

FIELD

This disclosure relates to wireless communication networks, including techniques for reference selection for a handover procedure with a primary secondary cell in a wireless communication network. Other aspects and techniques are also described.

BACKGROUND

Mobile communication in the next generation wireless communication system, 5G, or new radio (NR) network will provide ubiquitous connectivity and access to information and the ability to share data around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

In cellular networks, when a mobile device with an active communication connection is moving away from the coverage area of a first base station (a source base station) and entering the coverage area of a second base station (a target base station), the communication connection may be transferred to the target base station in order to avoid link termination when the mobile device gets out of coverage of the source base station. The process for transferring the communication connection of the mobile device from the source base station to the target base station is generally referred to as a handover (HO) process.

DETAILED DESCRIPTION

Figure 1:
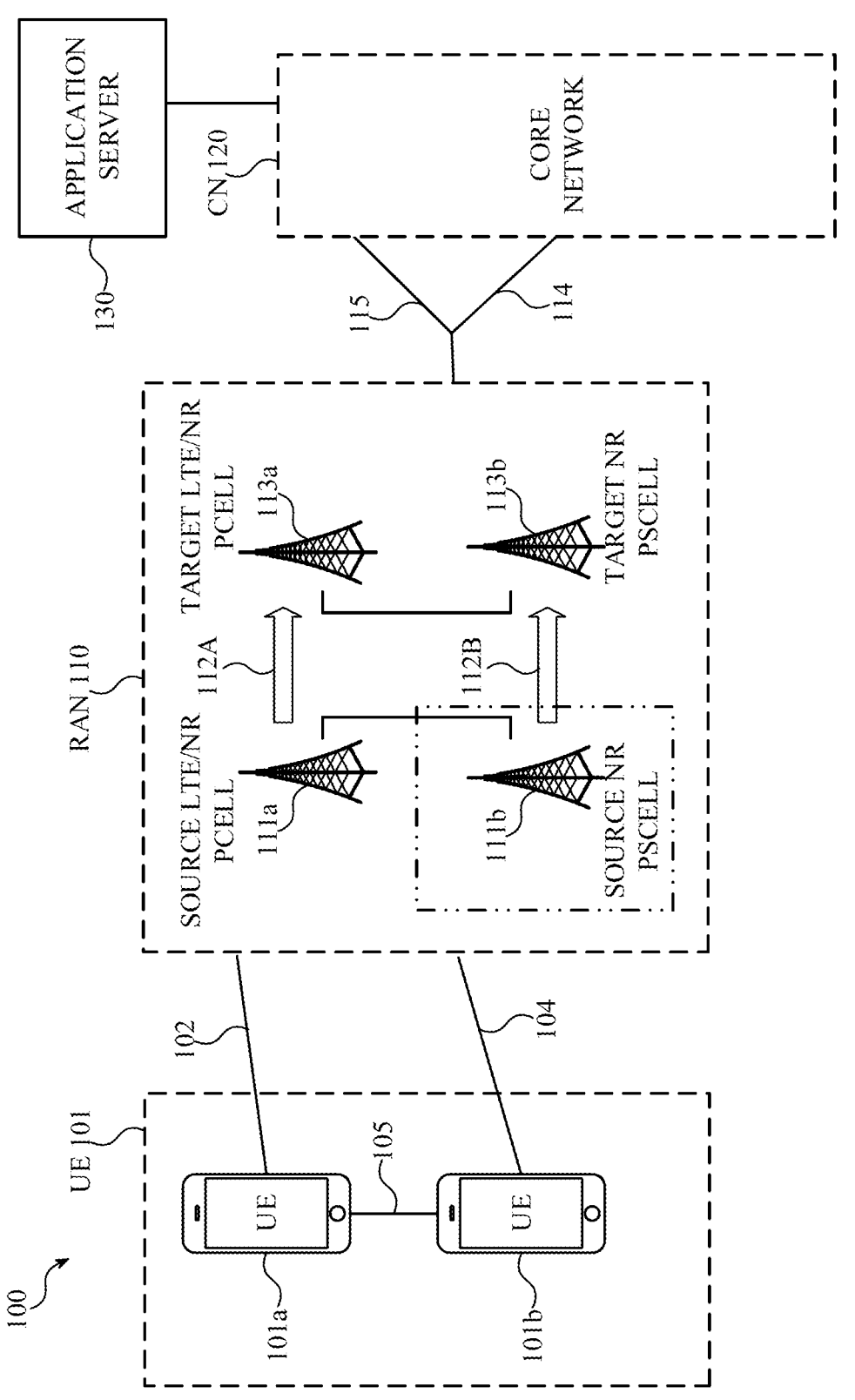
FIG. 1 illustrates a block diagram illustrating an architecture of a wireless system including a Radio Access Network (RAN) including nodes for dual connectivity configuration in accordance with some aspects.

The present disclosure is described with reference to the attached figures. The like reference numerals are used to refer to like elements throughout. The figures are not drawn to scale, and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

FIG. 1 illustrates an example architecture of a network system 100 in accordance with various aspects. The network system 100 includes UE 101a, UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, the UEs 101 can be IoT UEs comprising a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe), Device-to-Device (D2D) communication, sensor networks, or IoT networks. The M2M or MTC exchange of data can be a machine-initiated exchange of data. An IoT network describes interconnecting IoT UEs including uniquely identifiable embedded computing devices (within the Internet infrastructure) with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system, and the term "E-UTRAN" or the like can refer to a RAN 110 that operates in an LTE or 4G system. The UEs 101 utilize connections (or channels) 102 and 104 respectively comprising a physical communications interface/layer.

As the number of mobile devices within wireless networks and the demand for mobile data traffic continue to increase, changes are made to system requirements and architectures to increase communication capacity and speed. An aspect of such changes may include dual connectivity (DC), where a secondary node (SN) 111b/113b is utilized to provide additional resources to the UEs 101 while a master node (MN) 111a/113a provides control plane connection to the core network. The UEs 101 can be configured with DC as a multi-RAT or multi-Radio Dual Connectivity (MR-DC), where a multiple Rx/Tx capable UE may be configured to utilize resources provided by two different nodes (e.g., 111a and 111b, 113a and 113b, or other network nodes) that can be connected via non-ideal backhaul, one providing NR access and the other one providing either E-UTRA for LTE or NR access for 5G, for example. The MN 111a/113a and SN 111b/113b can be connected via a network interface, and at least the MN 111a/113a is connected to the core network (CN) 120. At least one of the MN 111a/113a or the SN 111b/113b can be operated with shared spectrum channel access. All functions specified for the UEs 101 can be used for integrated access and backhaul mobile termination (IAB-MT). Similar to the UEs 101, the IAB-MT can access the network using either one network node or using two different nodes with EN-DC architectures, NR-DC architectures, or the like. NR-DC is a DC configuration used in the 5G NR network, whereby both the MN 111a/113a and the SN 111b/113b are 5G gNBs. In EN-DC (Eutran NR Dual Connectivity), LTE would become an MCG (Master Cell Group), and NR would become an SCG (Secondary Cell Group).

In MR-DC, a group of serving cells associated with a master Node can be configured as a master cell group (MCG), comprising of a special cell (SpCell) as a primary cell (PCell) and optionally one or more secondary cells (SCells). An MCG can be the radio access node that provides the control plane connection to the core network (CN) 120; it may be a Master eNB (in EN-DC), a Master ng-eNB (in NGEN-DC), or a Master gNB (in NR-DC and NE-DC), for example. SpCell can either refer to the PCell of the MCG or the primary secondary cell (PSCell) of a second cell group (SCG) depending on if the MAC entity is associated with the MCG or the SCG, respectively. A SpCell can refer to a PCell of MCG or a PSCell of an SCG. An SCG in MR-DC can be a group of serving cells associated with an SN, comprising the SpCell as a PSCell and optionally one or more SCells.

During a mobility handover procedure 112A, the UE 101 is disconnected from a source PCell and connected with a target PCell. In order to shorten signaling and procedure time, a target PSCell change or addition procedure 112B may be performed in parallel with the PCell handover procedure 112A, where a target PSCell may be added or changed from a source PSCell for the UE 101. In 5G NR, the RAN 110 may provide a synchronization signal/physical broadcast channel block (SSB) measurement time configuration (SMTC) (e.g., measTimingCon fig) to the UE 101. The UE 101 may use the SMTC to measure and identify a target cell. The SMTC provides periodicity, time offset, and measurement duration to measure the SSB of the target cell. The SMTC is based on a system frame number (SFN) and a timing offset of a reference cell. Thus, the UE 101 measures a target PCell and a target PSCell in a time window indicated by the SMTC, with another cell used for reference timing of the SMTC. It is important to the UE 101 to understand the timing of the target cells for quick measurement and eventually finish handover procedure 112A and the target PSCell change or addition procedure 112B.

Figure 2:
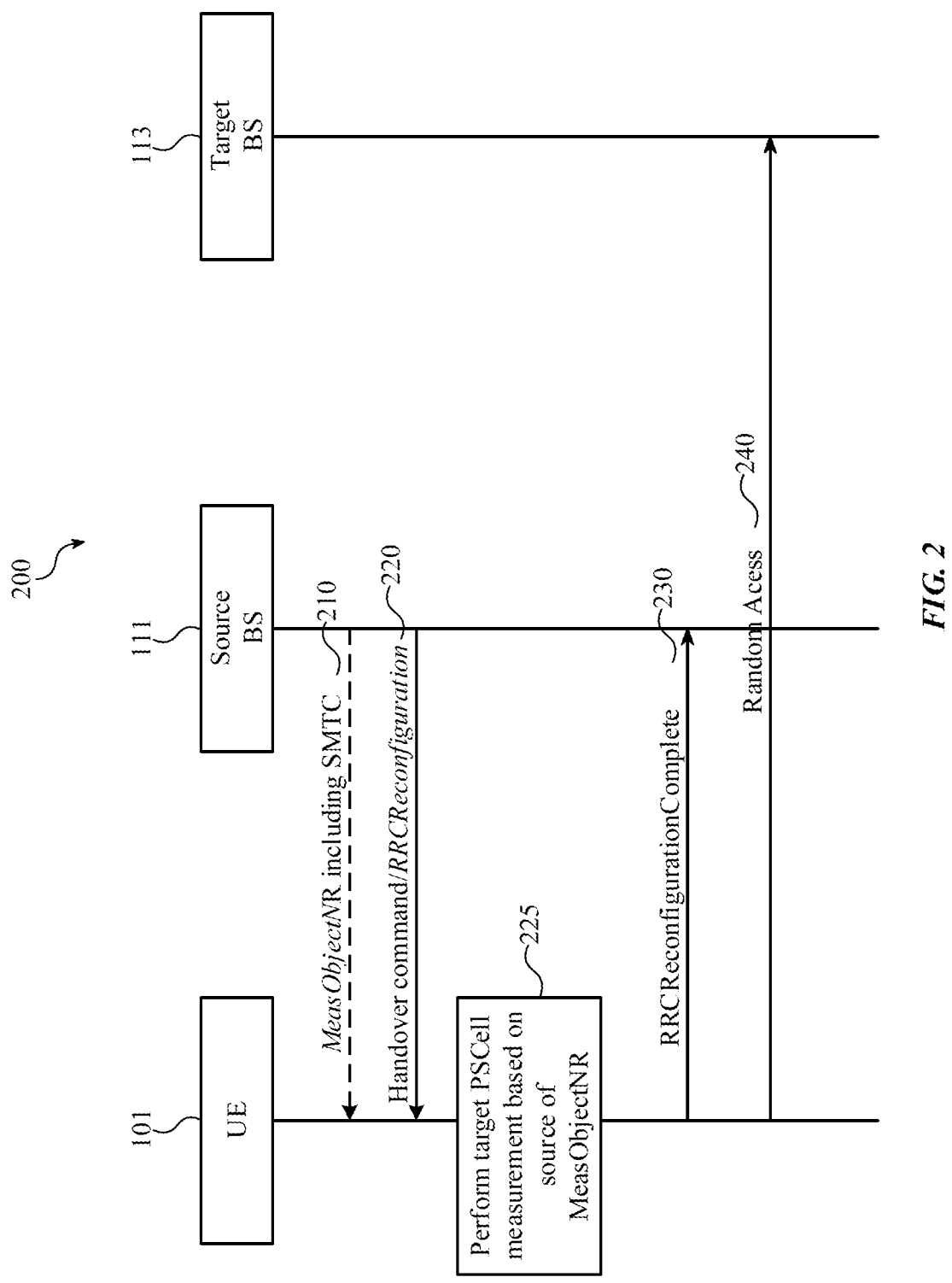
FIG. 2 illustrates a flow diagram showing a method of performing a handover procedure with PSCell change or addition employable by a UE, a source BS, and a target BS in accordance with some aspects.

FIG. 2 illustrates a flow diagram showing a method 200 of performing a handover procedure with PSCell change or addition in accordance with some aspects. As described above associated with FIG. 1, the handover procedure 112A and the PSCell change or addition procedures 112B for a UE 101 are performed from a source base station (BS) 111 to a target BS 113. The source BS 111 may comprise MN 111a including source PCells and source SCells, and SN 111b including source PSCells and additional source SCells. The target BS 113 may comprise MN 113a including target PCells and target SCells, and SN 113b including target PSCells and additional target SCells. For example, the source BS 111 can be an NR-DC BS architecture, an EN-DC BS architecture, or an NR-SA BS architecture. The target BS 113 can be an EN-DC BS architecture.

At act 220, a handover command is transmitted from the source BS 111 and received by the UE 101, including an RRC reconfiguration message. The handover command may also include a PSCell change or addition request. In some aspects, the UE 101 uses an SMTC received from the source BS 111 for the PSCell change or addition. The SMTC may be configured in a radio resource control (RRC) reconfiguration information element (IE) indicating SSB periodicity, offset, and duration configuration.

At act 225, the UE 101 performs measurement for the target BS 113. The measurement is for the target PCell and the target PSCell and may include different types of measurement quantities, such as Radio Signal Received Power (RSRP), Radio Signal Received Quality (RSRQ), Signal to Noise or Interference Ratio (SNIR).

At act 230, the UE 101 transmits an RRC reconfiguration complete message to the source BS 111. The RRC reconfiguration complete message may include a measurement report of the measurement performed at act 225. In some aspects, the measurement report provides factors to determine whether the handover or PSCell change/addition shall be finalized.

At act 240, the UE 101 performs a random access process to the target BS 113.

In one aspect, the UE 101 applies the SMTC and measures the target PSCell during a time window indicated by the SMTC using the target PCell for reference timing of the SMTC. In this case, the measurement of the target PSCell is delayed waiting for the target PCell, which loses time efficiency. An example of such RRC reconfiguration IEs for the PSCell change or addition includes targetCellSMTC-SCG for NR or RRCConnectionReconfiguration for E-UTRA system standards as provided by 3GPP technical specifications. In another aspect, the UE may measure the target PSCell during a time window indicated by the SMTC using the source PCell or the source PSCell (if existed), for reference timing of the SMTC when receiving an SMTC for the PSCell change or addition in an RRC reconfiguration IE. Examples of such RRC reconfiguration IEs include reconfigurationWithSync for NR or RRCConnectionReconfiguration for E-UTRA in 3GPP specification. In these cases, the UE 101 can perform PCell handover procedure and PSCell change or addition procedure parallel and improve signaling time.

In some aspects, if an SMTC for the PSCell change or addition is not configured in the RRC reconfiguration IEs transmitted such as targetCellSMTC-SCG, reconfiguration-

5

WithSync for NR or RRCConnectionReconfiguration for E-UTRA system standards as provided by 3GPP technical specifications, the UE 101 may use an SMTC in an NR measurement object received from the source BS 111. In one aspect, the NR measurement object can be previously configured and transmitted before the reception of the RRC message, as shown by act 210. In another aspect, the NR measurement object can be configured and transmitted simultaneously as the reception of the RRC reconfiguration message at act 220. The NR measurement object may be transmitted from the source PCell or the source PSCell and may or may not be on same frequency and subcarrier spacing of the target PSCell. An example of such an NR measurement object includes measObjectNR in NR system standards as provided by 3GPP technical specifications. In some aspects, the UE 101 uses the SMTC in measObjectNR only if SMTC is absent from RRC reconfiguration IEs of the source PCell and the source PSCell. Still, reference timing cells for the target PSCell measurement is to be defined in different scenarios.

Figure 3:
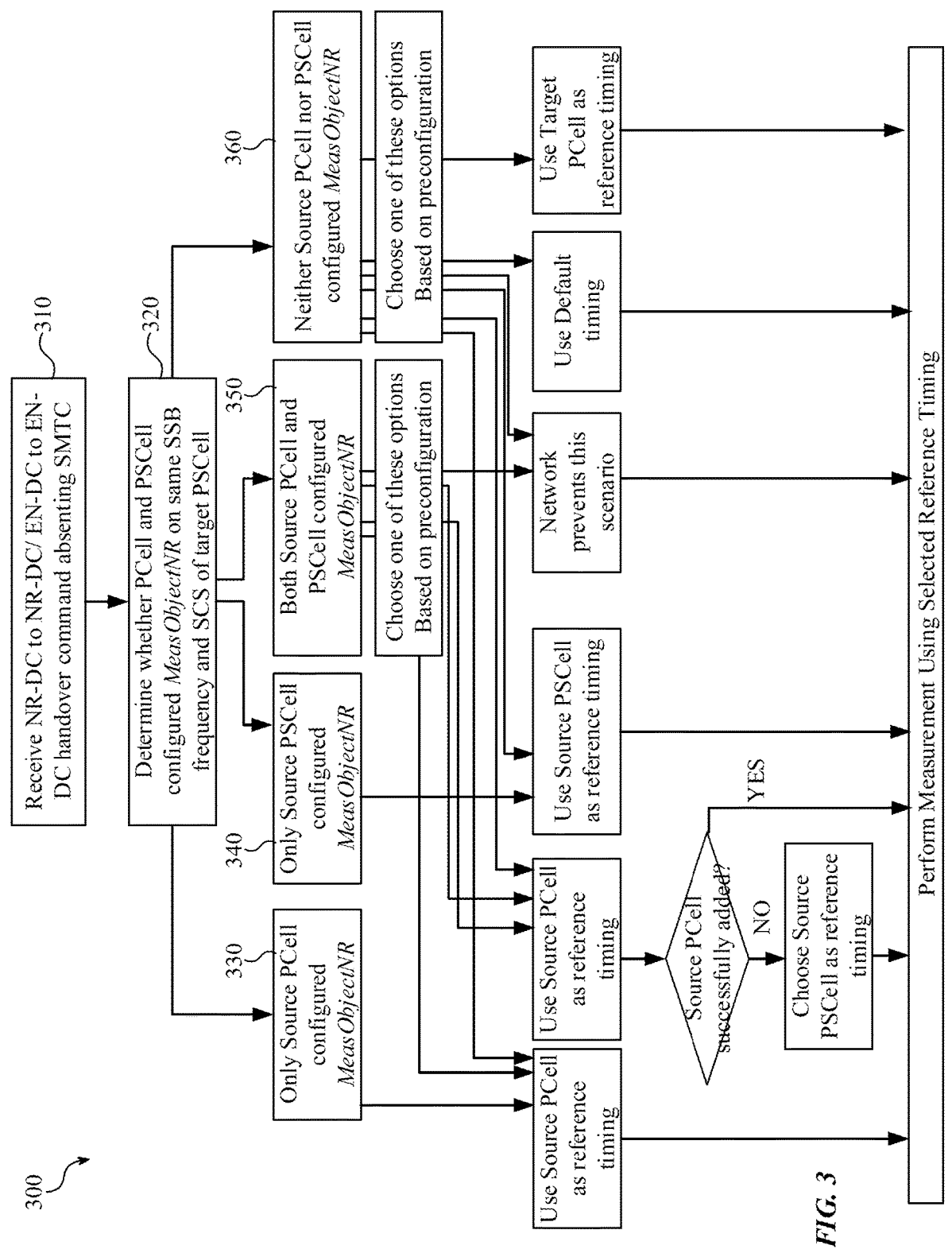
FIG. 3 illustrates a flow diagram of a wireless system, or a method employable by the wireless system performing a handover procedure with PSCell change in accordance with some aspects.

FIG. 3 illustrates a flow diagram 300 of a wireless system, or a method employable by the wireless system performing a handover procedure with PSCell change in accordance with some aspects. As an example, the wireless system can be the wireless system 100 as shown and discussed with reference to FIG. 1. As an example, the method can be the method 200 as shown and discussed with reference to FIG. 2. When a UE is configured to perform a handover procedure from a source NR-DC BS to a target NR-DC BS, PCell is changed from a source NR PCell to a target NR PCell, and PSCell is changed from a source NR PSCell to a target NR PSCell. When a UE is configured to perform a handover procedure from a source EN-DC BS to a target EN-DC BS, PCell is changed from a source LTE PCell to a target LTE PCell, and PSCell is changed from a source NR PSCell to a target NR PSCell. For the convenience of illustration, source PCell, target PCell, source PSCell, and target PSCell are used hereafter, and these terms should be understood as NR or LTE cells for the corresponding handover and PSCell change procedures. Also, the term measObjectNR in NR system standards as provided by 3GPP technical specifications is used as an example of a measurement object. However, the example aspects are not limited in this regard, and the described aspects may apply to other measurement objects and other networks that benefit from the principles described herein, such as future 3GPP systems (e.g., Sixth Generation (6G)) systems, IEEE 702.16 protocols (e.g., WMAN, WiMAX, etc.), or the like.

In some aspects, as discussed above, after a UE (e.g., the UE 101 in FIG. 2) receives a handover command, it is checked whether an SMTC for the PSCell change is configured in the RRC reconfiguration IEs transmitted. Examples of RRC reconfiguration IEs include IEs target-CellSMTC-SCG, reconfigurationWithSync for NR or RRC-ConnectionReconfiguration for E-UTRA system standards as provided by 3GPP technical specifications.

As shown by block 310, in one aspect, the SMTC for the PSCell change is absent from the handover command, and the UE may use an SMTC in an NR measurement object measObjectNR configured before the reception of the RRC message.

As shown by block 320, it is determined whether the source PCell or the source PSCell configures measObjectNR on same frequency and subcarrier spacing of the target PSCell. In some aspects, the UE uses the SMTC in measObjectNR only if SMTC is absent from RRC reconfiguration IEs of the source PCell and the source PSCell. Still, reference timing cells for the target PSCell measurement is to be defined in different scenarios.

As shown by block 330, in one aspect, if measObjectNR is configured by the source PCell (NR PCell for NR-DC and LTE PCell for EN-DC) on same frequency and subcarrier spacing of the target PSCell, the source PCell is used for reference timing of the SMTC of measObjectNR.

As shown by block 340, if measObjectNR is configured by the source PSCell on same frequency and subcarrier spacing of the target PSCell, the source PSCell is used as reference timing of the SMTC of measObjectNR. Comparing to a different approach where the source PCell is used for reference timing of the SMTC regardless of the provider of measObjectNR, more flexibility is provided since the UE can freely use measObjectNR configured by the source PSCell even if the source PSCell is asynchronous from the source PCell when the source PSCell is used as reference timing of the SMTC. The UE does not need additional implementations to correct the time difference and perform synchronization.

As shown by block 350, in some aspects, the source PCell and the source PSCell may respectively configure a measure object having same frequency and subcarrier spacing of the target PSCell. For example, a first measurement object MO1 is configured by the source PCell, and a second measurement object MO2 is configured by the source PSCell on same frequency and subcarrier spacing of the target PSCell. If the MO1 and the MO2 are synchronized and can be merged based on merge criteria, the UE is not restricted and can use either the source PCell or the source PSCell as reference timing of the SMTC. The merge criteria may include SMTC configurations, timings, RSSI measurement resources, or deriveSSB-IndexFromCell indications in NR system standards as provided by 3GPP technical specifications.

On the other hand, if MO1 and MO2 cannot be merged based on the merge criteria, in one aspect, the UE uses the source PCell as reference timing of the SMTC of measObjectNR for the target PSCell. In another aspect, the UE uses the source PSCell as reference timing of the SMTC of measObjectNR for the target PSCell. In an alternative aspect, the UE uses the source PCell as reference timing of the SMTC for the target NR PSCell first, and if and only if the target PSCell cannot be added successfully, the UE changes to use the source PSCell as reference timing of the SMTC of measObjectNR for the target PSCell. In a further alternative aspect, the source PCell and the source PSCell are not allowed to both configure measure objects having same frequency and subcarrier spacing of the target PSCell. One and only one of the source PCell or the source PSCell configures the SMTC of the measurement object MeasObjectNR having same frequency and subcarrier spacing of the target PSCell. By restricting only one SMTC for the target PSCell, confusion and complicity can be avoided, and the system can be simplified.

As shown by block 360, in some aspects, the SMTC of the measurement object MeasObjectNR is not configured on same frequency and subcarrier spacing of the target PSCell or is configured on a same frequency but not a same subcarrier spacing of the target PSCell. In one aspect, the UE uses the source PCell as reference timing of the SMTC for the target NR PSCell. In an alternative aspect, the UE uses the source PSCell as reference timing of the SMTC for the target NR PSCell. In a further alternative aspect, the UE uses the source PCell as reference timing of the SMTC for the target NR PSCell first, and if and only if the target PSCell cannot be added successfully, the UE changes to use the source PSCell as reference timing of the SMTC for the target PSCell. In a further alternative aspect, the UE uses the target PCell as reference timing of the SMTC for the target NR PSCell. The target PCell is newly connected during the handover procedure, thus providing more updated and accurate target PCell reference timing. In a further alternative aspect, the UE assumes a fixed by default periodicity of the SMTC with any time offset. An example periodicity can be 5 ms.

Figure 4:
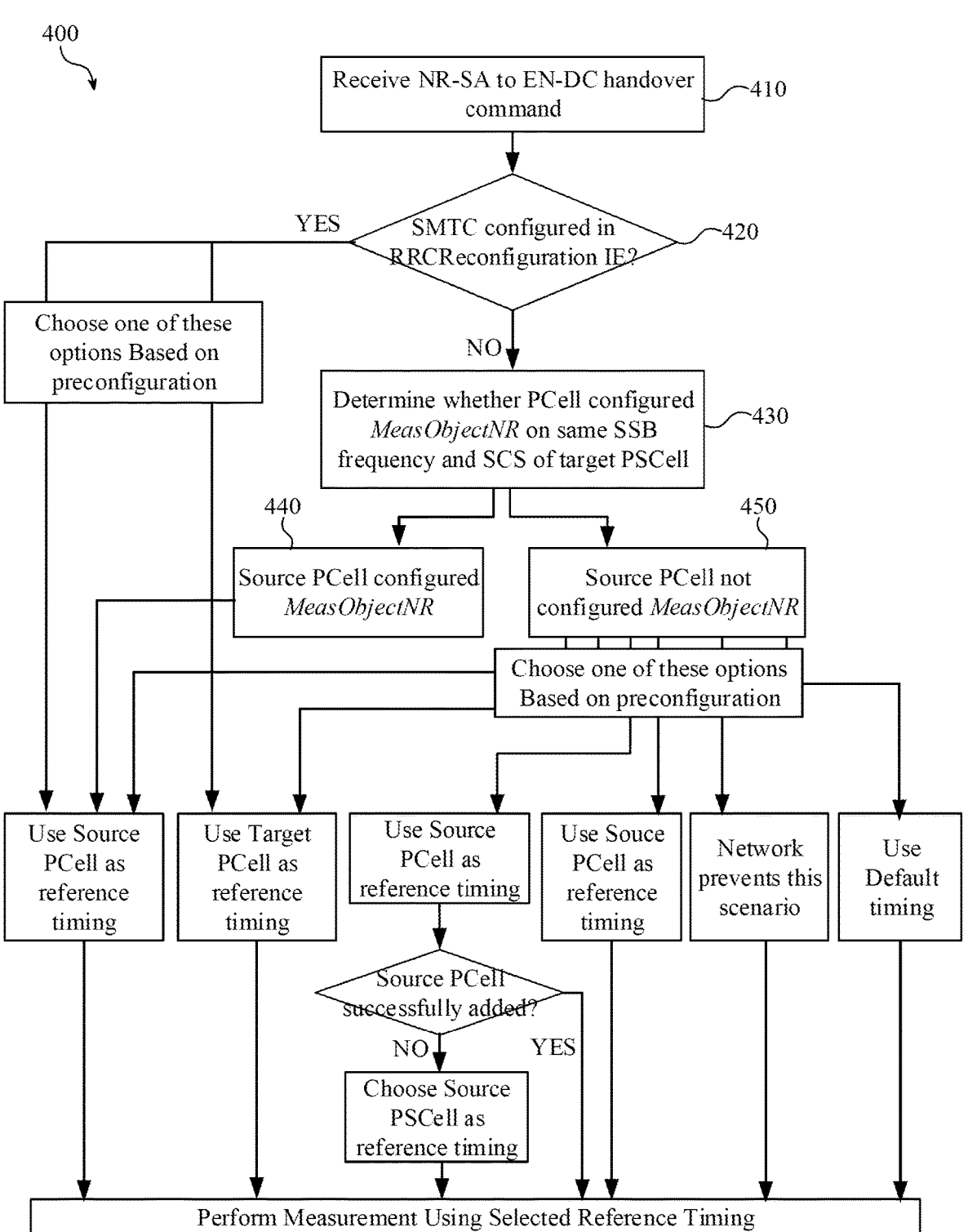
FIG. 4 illustrates a flow diagram of a wireless system, or a method employable by the wireless system performing a handover procedure with PSCell addition in accordance with some aspects.

FIG. 4 illustrates a flow diagram 400 of a wireless system, or a method employable by the wireless system performing a handover procedure with PSCell addition in accordance with some aspects. As an example, the wireless system can be the wireless system 100 as shown and discussed with reference to FIG. 1. As an example, the method can be the method 200 as shown and discussed with reference to FIG. 2. The UE is configured to perform a handover procedure with PSCell addition, such as a handover procedure from a source NR SA (stand-alone) to a target NR-DC or EN-DC, PCell is changed from a source NR PCell to a target NR PCell or an LTE PCell, and PSCell is added as a target NR PSCell. Similar to above, for the convenience of illustration, source PCell, target PCell, and target PSCell are used hereafter, and these terms should be understood as NR or LTE cells for corresponding handover and PSCell addition procedures. Also, the term measObjectNR in NR system standards as provided by 3GPP technical specifications is used as an example of a measurement object configured before the reception of the RRC message. However, the example aspects are not limited in this regard, and the described aspects may apply to other networks that benefit from the principles described herein, such as future 3GPP systems (e.g., Sixth Generation (6G)) systems, IEEE 702.16 protocols (e.g., WMAN, WiMAX, etc.), or the like.

As shown by block 410, a UE (e.g., the UE 101 in FIG. 2) receives a handover command.

As shown by block 420, the UE checks whether an SMTC for the PSCell addition is configured in the RRC reconfiguration IEs transmitted. Examples of such RRC reconfiguration IEs include targetCellSMTC-SCG as provided by 3GPP technical specifications. If the SMTC is configured in targetCellSMTC-SCG, in one aspect, the UE applies the SMTC and measures the target PSCell during a time window indicated by the SMTC using the target PCell for reference timing of the SMTC. In an alternative aspect, the UE may measure the target PSCell during a time window indicated by the SMTC using the source PCell for reference timing.

As shown by block 430, if the SMTC is not configured in targetCellSMTC-SCG, the UE may use an SMTC in an NR measurement object configured before the reception of the RRC message. The NR measurement object may be transmitted from the source PCell or the source PSCell and may or may not be on same frequency and subcarrier spacing of the target PSCell.

As shown by block 440, in some aspects, the UE uses the source PCell for reference timing of the SMTC for the target NR PSCell if measObjectNR is configured by the source PCell on same frequency and subcarrier spacing of the target PSCell.

As shown by block 450, in one aspect, the UE uses the source PCell as reference timing of the SMTC for the target NR PSCell if measObjectNR is not configured by the source PCell on same frequency and subcarrier spacing of the target PSCell. In an alternative aspect, the UE uses the target PCell as reference timing of the SMTC for the target NR PSCell. The target PCell is newly connected during the handover procedure and thus provides more updated and accurate target PCell reference timing. In a further alternative aspect, the UE assumes a fixed by default periodicity of the SMTC with any time offset. An example periodicity can be 5 ms. In a further alternative aspect, the source PCell is required to configure MeasObjectNR having same frequency and subcarrier spacing of the target PSCell, and the source PCell is used for reference timing of the SMTC for the target NR PSCell.

Referring back to FIG. 1, the RAN 110 can include one or more access AN nodes or RAN nodes that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). According to various aspects, the RAN nodes can be implemented as one or more of a dedicated physical device such as a macrocell base station and/or a low power (LP) base station for providing femtocells, picocells, or other like cells having smaller coverage areas, smaller user capacity, or higher bandwidth compared to macrocells.

In some embodiments, all or parts of the RAN nodes can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes; a Media Access Control (MAC)/Physical (PHY) layer split wherein RRC, PDCP, RLC, and MAC layers are operated by the CRAN/vBBUP and the PHY layer is operated by individual RAN nodes; or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN nodes to perform other virtualized applications.

In some implementations, an individual RAN node can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally, or alternatively, one or more of the RAN nodes can be next generation eNBs (ng-eNBs), which are RAN nodes that provide E-UTRA user plane and control plane protocol terminations toward the UEs 101, and are connected to a 5GC via an NG interface.

Any of the RAN nodes can terminate the air interface protocol and can be the first point of contact for the UEs 101. In some embodiments, any of the RAN nodes can fulfill various logical functions for the RAN 110, including, but not limited to, the radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes over a multicarrier communication channel in accordance with various communication techniques, such as but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The RAN 110 is shown to be communicatively coupled to the CN 120. The CN 120 can comprise a plurality of network elements, which are configured to offer various data and telecommunications services to customers/subscribers (e.g., users of UEs 101) who are connected to the CN 120 via the RAN 110. The components of the CN 120 can be implemented in one physical node or separate physical nodes, including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, an application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC.

In aspects, the CN 120 can be a 5GC (referred to as "5GC 120" or the like), and the RAN 110 can be connected with the CN 120 via two parts, a Next Generation (NG) user plane (NG-U) interface 114, which carries traffic data between the RAN nodes and a User Plane Function (UPF), and the 51 control plane (NG-C) interface 115, which is a signaling interface between the RAN nodes and Access and Mobility Management Functions (AMFs).

Figure 5:
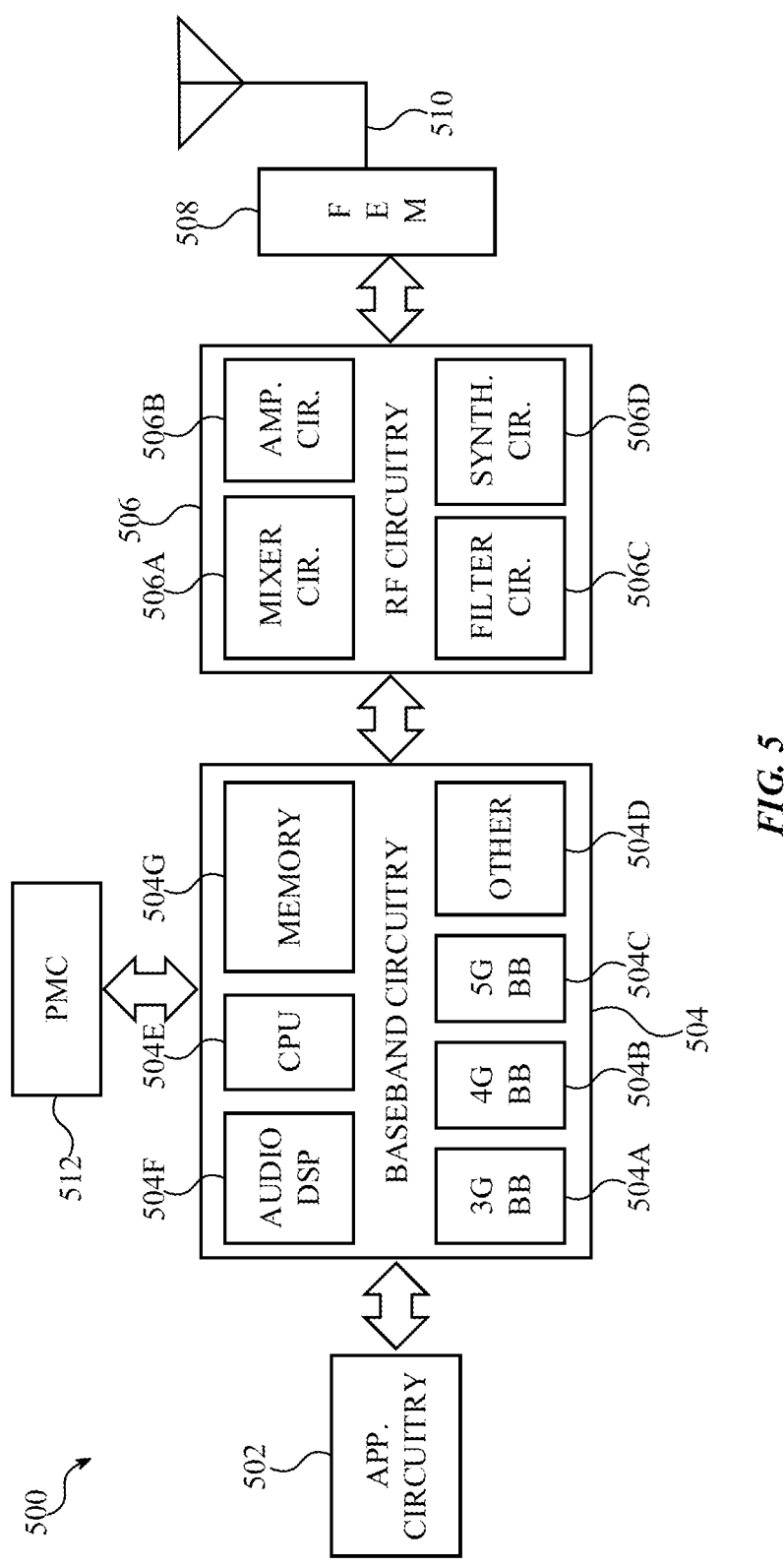
FIG. 5 illustrates a diagram illustrating example components of a device that can be employed in accordance with some aspects.

FIG. 5 illustrates a diagram illustrating example components of a device 500 that can be employed in accordance with some aspects. In some implementations, the device 500 can include application circuitry 502, baseband circuitry 504, Radio Frequency (RF) circuitry 506, front-end module (FEM) circuitry 508, one or more antennas 56, and power management circuitry (PMC) 512 coupled together at least as shown. The components of the illustrated device 500 can be included in a UE or a RAN node. In some implementations, the device 500 can include fewer elements (e.g., a RAN node may not utilize application circuitry 502 and instead include a processor/controller to process IP data received from a CN such as 5GC 130 or an Evolved Packet Core (EPC)). In some implementations, the device 500 can include additional elements such as, for example, memory/storage, display, camera, sensor (including one or more temperature sensors, such as a single temperature sensor, a plurality of temperature sensors at different locations in device 500, etc.), or input/output (I/O) interface. In other implementations, the components described below can be included in more than one device (e.g., said circuitries can be separately included in more than one device for Cloud-RAN (C-RAN) implementations).

The application circuitry 502 can include one or more application processors. For example, the application circuitry 502 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 500. In some implementations, processors of application circuitry 502 can process IP data packets received from an EPC.

The baseband circuitry 504 can include circuitry such as, but not limited to, one or more single-core or multi-core processors. The baseband circuitry 504 can include one or more baseband processors or control logic to process baseband signals received from a receive signal path of the RF circuitry 506 and to generate baseband signals for a transmit signal path of the RF circuitry 506. Baseband circuitry 504 can interface with the application circuitry 502 for generation and processing of the baseband signals and for controlling operations of the RF circuitry 506. For example, in some implementations, the baseband circuitry 504 can include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) can handle various radio control functions that enable communication with one or more radio networks via the RF circuitry 506. In other implementations, some or all of the functionality of baseband processors 504A-D can be included in modules stored in the memory 504G and executed via a Central Processing Unit (CPU) 504E. The radio control functions can include but are not limited to signal modulation/demodulation, encoding/decoding, radio frequency shifting, etc. In some implementations, modulation/demodulation circuitry of the baseband circuitry 504 can include Fast-Fourier Transform (FFT), precoding, or constellation mapping/demapping functionality. In some implementations, encoding/decoding circuitry of the baseband circuitry 504 can include convolution, tail-biting convolution, turbo, Viterbi, or Low Density Parity Check (LDPC) encoder/decoder functionality. Implementations of modulation/demodulation and encoder/decoder functionality are not limited to these examples and can include other suitable functionality in other implementations.

In some implementations, the baseband circuitry 504 can include one or more audio digital signal processor(s) (DSP) 504F. The audio DSP(s) 504F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 504 and the application circuitry 502 can be implemented together such as, for example, on a system on a chip (SOC).

In some implementations, the baseband circuitry 504 can provide for communication compatible with one or more radio technologies. For example, in some implementations, the baseband circuitry 504 can support communication with an NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 504 is configured to support radio communications of more than one wireless protocol can be referred to as multi-mode baseband circuitry.

RF circuitry 506 can enable communication with wireless networks using modulated electromagnetic radiation through a non-solid medium. In various implementations, the RF circuitry 506 can include switches, filters, amplifiers, etc., to facilitate communication with the wireless network. RF circuitry 506 can include a receive signal path which can include circuitry to down-convert RF signals received from the FEM circuitry 508 and provide baseband signals to the baseband circuitry 504. RF circuitry 506 can also include a transmit signal path which can include circuitry to up-convert baseband signals provided by the baseband circuitry 504 and provide RF output signals to the FEM circuitry 508 for transmission.

In some implementations, the receive signal path of the RF circuitry 506 can include mixer circuitry 506*a*, amplifier circuitry 506*b*, and filter circuitry 506*c*. In some implementations, the transmit signal path of the RF circuitry 506 can include filter circuitry 506*c* and mixer circuitry 506*a*. RF circuitry 506 can also include synthesizer circuitry 506*d* for synthesizing a frequency for use by the mixer circuitry 506*a* of the receive signal path and the transmit signal path. In some implementations, the mixer circuitry 506*a* of the receive signal path can be configured to down-convert RF signals received from the FEM circuitry 508 based on the synthesized frequency provided by synthesizer circuitry 506*d*. The amplifier circuitry 506*b* can be configured to amplify the down-converted signals, and the filter circuitry 506*c* can be a low-pass filter (LPF) or band-pass filter (BPF) configured to remove unwanted signals from the down-converted signals to generate output baseband signals. Output baseband signals can be provided to the baseband circuitry 504 for further processing. In some implementations, the output baseband signals can be zero-frequency baseband signals, although this is not a requirement. In some implementations, mixer circuitry 506*a* of the receive signal path can comprise passive mixers, although the scope of the implementations is not limited in this respect.

In some implementations, the mixer circuitry 506*a* of the transmit signal path can be configured to up-convert input baseband signals based on the synthesized frequency provided by the synthesizer circuitry 506*d* to generate RF output signals for the FEM circuitry 508. The baseband signals can be provided by the baseband circuitry 504 and can be filtered by filter circuitry 506*c*.

In some implementations, the mixer circuitry 506*a* of the receive signal path and the mixer circuitry 506*a* of the transmit signal path can include two or more mixers and can be arranged for quadrature downconversion and upconversion, respectively. In some implementations, the mixer circuitry 506*a* of the receive signal path and the mixer circuitry 506*a* of the transmit signal path can include two or more mixers and can be arranged for image rejection (e.g., Hartley image rejection). In some implementations, the mixer circuitry 506*a* of the receive signal path and the mixer circuitry 506*a* can be arranged for direct downconversion and direct upconversion, respectively. In some implementations, the mixer circuitry 506*a* of the receive signal path and the mixer circuitry 506*a* of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 506 can include analog-to-digital converter (ADC) and digital-to-analog converter (DAC) circuitry, and the baseband circuitry 504 can include a digital baseband interface to communicate with the RF circuitry 506.

In some dual-mode implementations, a separate radio IC circuitry can be provided for processing signals for each spectrum, although the scope of the implementations is not limited in this respect.

In some implementations, the synthesizer circuitry 506*d* can be a fractional-N synthesizer or a fractional N/N+1 synthesizer, although the scope of the implementations is not limited in this respect as other types of frequency synthesizers can be suitable. For example, synthesizer circuitry 506*d* can be a delta-sigma synthesizer, a frequency multiplier, or a synthesizer comprising a phase-locked loop with a frequency divider.

The synthesizer circuitry 506*d* can be configured to synthesize an output frequency for use by the mixer circuitry 506*a* of the RF circuitry 506 based on a frequency input and a divider control input. In some implementations, the synthesizer circuitry 506*d* can be a fractional N/N+1 synthesizer.

In some implementations, frequency input can be provided by a voltage-controlled oscillator (VCO), although that is not a requirement. Divider control input can be provided by either the baseband circuitry 504 or the application circuitry 502, depending on the desired output frequency. In some implementations, a divider control input (e.g., N) can be determined from a look-up table based on a channel indicated by the application circuitry 502.

Synthesizer circuitry 506*d* of the RF circuitry 506 can include a divider, a delay-locked loop (DLL), a multiplexer, and a phase accumulator. In some implementations, the divider can be a dual modulus divider (DMD), and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump, and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 506d can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 506 can include an IQ/polar converter.

FEM circuitry 508 can include a receive signal path which can include circuitry configured to operate on RF signals received from one or more antennas 56, amplify the received signals and provide the amplified versions of the received signals to the RF circuitry 506 for further processing. FEM circuitry 508 can also include a transmit signal path which can include circuitry configured to amplify signals for transmission provided by the RF circuitry 506 for transmission by one or more of the one or more antennas 56. In various implementations, the amplification through the transmit or receive signal paths can be done solely in the RF circuitry 506, solely in the FEM circuitry 508, or in both the RF circuitry 506 and the FEM circuitry 508.

In some implementations, the FEM circuitry 508 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 506). The transmit signal path of the FEM circuitry 508 can include a power amplifier (PA) to amplify input RF signals (e.g., provided by RF circuitry 506), and one or more filters to generate RF signals for subsequent transmission (e.g., by one or more of the one or more antennas 56).

In some implementations, the PMC 512 can manage power provided to the baseband circuitry 504. In particular, the PMC 512 can control power-source selection, voltage scaling, battery charging, or DC-to-DC conversion. The PMC 512 can often be included when the device 500 is capable of being powered by a battery, for example, when the device is included in a UE. The PMC 512 can increase the power conversion efficiency while providing desirable implementation size and heat dissipation characteristics.

While FIG. 5 shows the PMC 512 coupled only with the baseband circuitry 504. However, in other implementations, the PMC 512 may be additionally or alternatively coupled with, and perform similar power management operations for, other components such as, but not limited to, application circuitry 502, RF circuitry 506, or FEM circuitry 508.

In some implementations, the PMC 512 can control, or otherwise be part of, various power saving mechanisms of the device 500. For example, if the device 500 is in an RRC_Connected state, where it is still connected to the RAN node as it expects to receive traffic shortly, then it can enter a state known as Discontinuous Reception Mode (DRX) after a period of inactivity. During this state, the device 500 can power down for brief intervals of time and thus save power.

If there is no data traffic activity for an extended period of time, then the device 500 can transition off to an RRC Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 502 and processors of the baseband circuitry 504 can be used to execute elements of one or more instances of a protocol stack. For example, processors of the baseband circuitry 504, alone or in combination, can be used execute Layer 3, Layer 2, or Layer 1 functionality, while processors of the baseband circuitry 504 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 6:
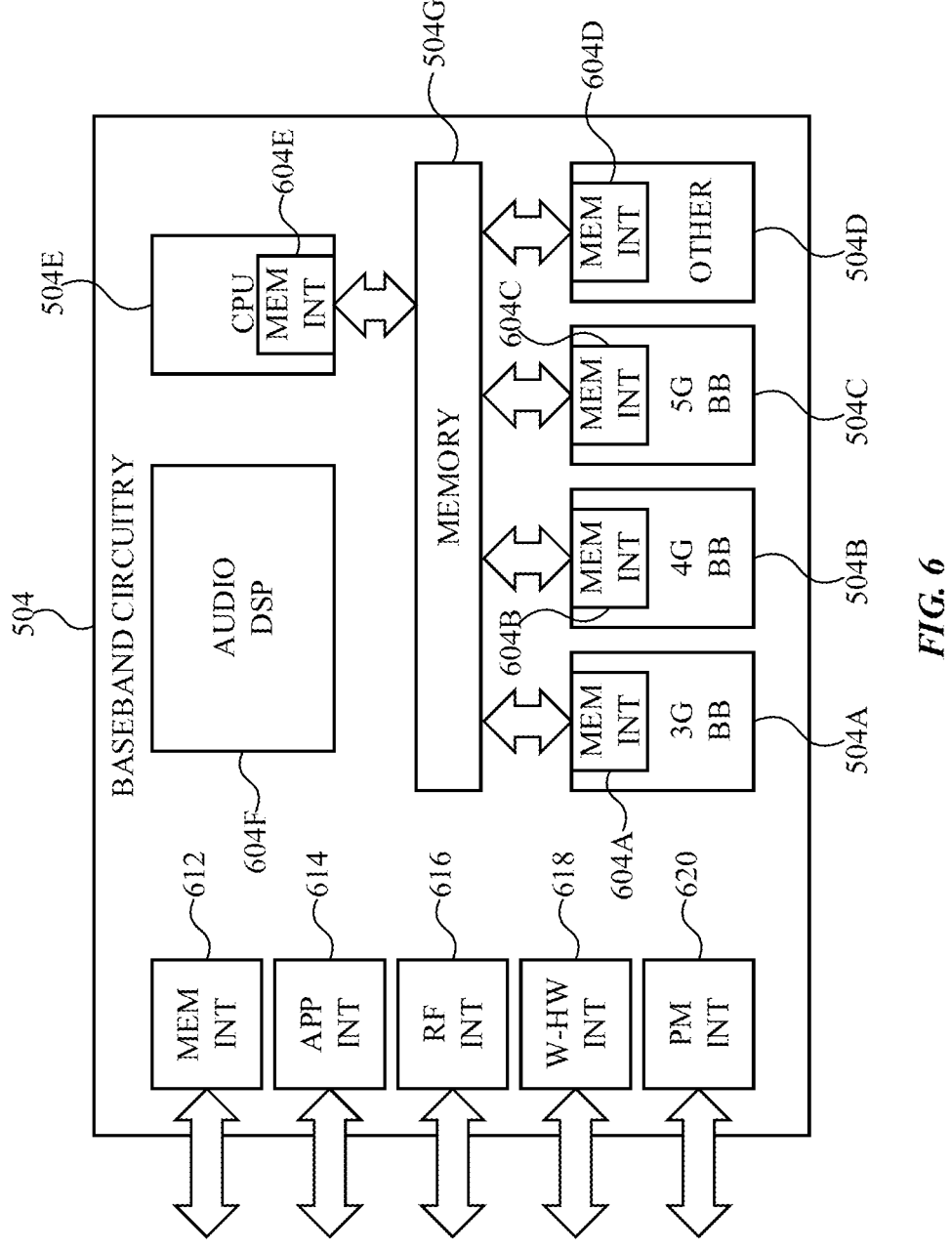
FIG. 6 illustrates a diagram illustrating example interfaces of baseband circuitry that can be employed in accordance with some aspects.

FIG. 6 illustrates a diagram illustrating example interfaces of baseband circuitry that can be employed in accordance with some aspects. As discussed above, the baseband circuitry 504 of FIG. 5 can comprise processors 504A-904E and a memory 504G utilized by said processors. Each of the processors 504A-204E can include a memory interface, 604A-604E, respectively, to send/receive data to/from the memory 504G.

The baseband circuitry 504 can further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512).

ADDITIONAL EXAMPLES

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a baseband processor for a user equipment (UE) configured to perform operations comprising receiving radio resource control (RRC) information elements including a measurement object having a synchronization signal/physical broadcast channel (SS/PBCH) block measurement time configuration (SMTC), receiving a RRC reconfiguration message including a handover command including a Primary Secondary Cell (PSCell) change from a source PSCell to a target PSCell during a Primary Cell (PCell) handover procedure from a source PCell to a target PCell, and performing measurements of the target PSCell in accordance with the SMTC. The source PCell is used for reference timing of the SMTC if the measurement object is configured by the source PCell on same frequency and subcarrier spacing of the target PSCell. The source PSCell is used for reference timing of the SMTC if the measurement object is configured by the source PSCell on same frequency and subcarrier spacing of the target PSCell.

Example 2 comprises the subject matter of any variation of any of example(s) 1, wherein one and only one of the source PCell or the source PSCell configures the SMTC of the measurement object on same frequency and subcarrier spacing of the target PSCell.

Example 3 comprises the subject matter of any variation of any of example(s) 1, either the source PCell or the source PSCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 can be merged.

Example 4 comprises the subject matter of any variation of any of example(s) 1 and 3, wherein the source PCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 cannot be merged.

Example 5 comprises the subject matter of any variation of any of example(s) 1 and 3, wherein the source PSCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 cannot be merged.

Example 6 comprises the subject matter of any variation of any of example(s) 1 and 3, wherein the source PSCell is used for reference timing of the SMTC only if using the source PCell fails if a first measurement object (MO1) is configured by the source PCell and a second measurement object (MO2) is configured by the source PSCell on same frequency and subcarrier spacing of the target PSCell, and if the MO1 and the MO2 cannot be merged.

Example 7 comprises the subject matter of any variation of any of example(s) 1 and 3-6, wherein the source PSCell is used for reference timing of the SMTC only if using the source PCell fails if a first measurement object (MO1) is configured by the source PCell and a second measurement object (MO2) is configured by the source PSCell on same frequency and subcarrier spacing of the target PSCell, and if the MO1 and the MO2 cannot be merged.

Example 8 comprises the subject matter of any variation of any of example(s) 1 and 3-6, wherein the source PSCell is used for reference timing of the SMTC only if using the source PCell fails if a first measurement object (MO1) is configured by the source PCell and a second measurement object (MO2) is configured by the source PSCell on same frequency and subcarrier spacing of the target PSCell, and if the MO1 and the MO2 cannot be merged.

Example 9 comprises the subject matter of any variation of any of example(s) 1 and 3-6, wherein the SMTC is assumed a fixed periodicity if the SMTC of the measurement object is not configured on same frequency and subcarrier spacing of the target PSCell.

Example 10 comprises the subject matter of any variation of any of example(s) 1 and 3-6, wherein the source PSCell is used for reference timing of the SMTC if the SMTC of the measurement object is not configured on same frequency and subcarrier spacing of the target PSCell.

Example 11 comprises the subject matter of any variation of any of example(s) 1 and 3-6, wherein source PSCell is used for reference timing of the SMTC only if using the source PCell fails if the SMTC of the measurement object is not configured on same frequency and subcarrier spacing of the target PSCell.

Example 12 comprises the subject matter of any variation of any of example(s) 1-11, wherein the handover procedure is from a source New Radio Dual Connectivity (NR-DC) configuration to a target NR-DC configuration.

Example 13 comprises the subject matter of any variation of any of example(s) 1-11, wherein the handover procedure is from a source E-UTRAN New-Radio Dual Connectivity (EN-DC) configuration to a target EN-DC configuration.

Example 14 comprises the subject matter of any variation of any of example(s) 1-13, wherein the SMTC of the measurement object is configured before reception of the RRC reconfiguration message.

Example 15 comprises the subject matter of any variation of any of example(s) 1-13, wherein the measurement object is received at the same time as the reception of the RRC reconfiguration message.

Example 16 is a baseband processor for a user equipment (UE) configured to perform operations comprising receiving a synchronization signal/physical broadcast channel (SS/PBCH) block measurement time configuration (SMTC) for a target NR Primary Secondary Cell (PSCell) addition of a handover procedure from a source New Radio Stand Alone (NR-SA) configuration to a target E-UTRAN New-Radio Dual Connectivity (EN-DC) configuration. Wherein a target LTE primary cell (PCell) is used for reference timing if the SMTC is configured in a target cell information element targetCellSMTC-SCG.

Example 17 is a baseband processor for a user equipment (UE) configured to perform operations comprising receiving a synchronization signal/physical broadcast channel (SS/PBCH) block measurement time configuration (SMTC) for a target NR Primary Secondary Cell (PSCell) addition of a handover procedure from a source New Radio Stand Alone (NR-SA) configuration to a target E-UTRAN New-Radio Dual Connectivity (EN-DC) configuration. Wherein a source NR primary cell (PCell) is used for reference timing of the SMTC if the SMTC for the target NR PSCell is configured in a target cell information element targetCellSMTC-SCG.

Example 18 is a baseband processor for a user equipment (UE) configured to perform operations comprising receiving a synchronization signal/physical broadcast channel (SS/PBCH) block measurement time configuration (SMTC) for a target NR Primary Secondary Cell (PSCell) addition of a handover procedure from a source New Radio Stand Alone (NR-SA) configuration to a target E-UTRAN New-Radio Dual Connectivity (EN-DC) configuration. Wherein a source NR primary cell (PCell) is used for reference timing of the SMTC if the SMTC for the target NR PSCell is configured in a measurement object of radio resource control (RRC) information elements on same frequency and subcarrier spacing of the target NR PSCell.

Example 19 is a baseband processor for a user equipment (UE) configured to perform operations comprising receiving a synchronization signal/physical broadcast channel (SS/PBCH) block measurement time configuration (SMTC) for a target NR Primary Secondary Cell (PSCell) addition of a handover procedure from a source New Radio Stand Alone (NR-SA) configuration to a target E-UTRAN New-Radio Dual Connectivity (EN-DC) configuration. Wherein a source NR primary cell (PCell) is used for reference timing of the SMTC if the target NR PSCell is configured in a measurement object of radio resource control (RRC) information elements, and if the SMTC of the measurement object is configured by the source NR PCell on same frequency and subcarrier spacing of the target NR PSCell. Wherein a target LTE PCell is used for reference timing of the SMTC if the SMTC for the target NR PSCell is not configured in a measurement object on same frequency and subcarrier spacing of the target NR PSCell.

Example 20 is a baseband processor for a user equipment (UE) configured to perform operations comprising receiving a synchronization signal/physical broadcast channel (SS/PBCH) block measurement time configuration (SMTC) for a handover procedure from a source New Radio Stand Alone (NR-SA) configuration to a target E-UTRAN New-Radio Dual Connectivity (EN-DC) configuration including adding a target NR Primary Secondary Cell (PSCell). Wherein a source primary cell (PCell) is used for reference timing of the SMTC if the SMTC is configured in a measurement object, and if the SMTC is configured by the source PCell on same frequency and subcarrier spacing of the target NR PSCell. Wherein the SMTC is assumed a fixed periodicity if the SMTC is configured in the measurement object but not configured on same frequency and subcarrier spacing of the target NR PSCell.

Example 21 is a baseband processor for a base station (BS). The baseband processor configured to perform operations comprising transmitting radio resource control (RRC) information elements to a user equipment (UE) including a measurement object having a synchronization signal/physical broadcast channel (SS/PBCH) block measurement time configuration (SMTC) and transmitting a handover command for a handover procedure including changing a source Primary Secondary Cell (PSCell) to a target PSCell or adding the target PSCell. Wherein the SMTC is used for the target PSCell change or addition, and a source primary cell (PCell) is used for reference timing of the SMTC.

Example 22 comprises the subject matter of any variation of any of example(s) 21, wherein the source PCell is used for reference timing of the SMTC if the measurement object is configured by the source PCell on same frequency and subcarrier spacing of the target PSCell and wherein a source PSCell is used for reference timing of the SMTC if the measurement object is configured by the source PSCell on same frequency and subcarrier spacing of the target PSCell.

Example 23 comprises the subject matter of any variation of any of example(s) 21-22, wherein the measurement object is configured by one and only one of the source PCell and a source PSCell on same frequency and subcarrier spacing of the target PSCell.

Example 24 is a baseband processor for a base station (BS). The baseband processor configured to perform operations comprising transmitting radio resource control (RRC) information elements to a user equipment (UE) including a measurement object having a synchronization signal/physical broadcast channel (SS/PBCH) block measurement time configuration (SMTC) and transmitting a handover command for a handover procedure including a target Primary Secondary Cell (PSCell) change or addition. Wherein the SMTC is used for the target PSCell change or addition, and a target primary cell (PCell) is used for reference timing of the SMTC if the SMTC of the measurement object is not configured on same frequency and subcarrier spacing of the target PSCell.

Example 25 is a method for a user equipment (UE) to perform measurement operations for a handover procedure, the method comprising receiving radio resource control (RRC) information elements from a base station (BS) including a measurement object having a synchronization signal/physical broadcast channel (SS/PBCH) block measurement time configuration (SMTC), receiving a handover command including a target NR Primary Secondary Cell (PSCell) change or addition, and performing measurements of a target PSCell in accordance with the SMTC. Wherein a source primary cell (PCell) is used for reference timing of the SMTC if the measurement object is configured by the source PCell on same frequency and subcarrier spacing of the target PSCell. Wherein a source PSCell is used for reference timing of the SMTC if the measurement object is configured by the source PSCell on same frequency and subcarrier spacing of the target PSCell.

Example 26 comprises the subject matter of any variation of any of example(s) 25, wherein the SMTC is assumed a fixed periodicity if the SMTC of the measurement object is not configured on same frequency and subcarrier spacing of the target PSCell.

Example 27 is a user equipment (UE) configured to perform operations comprising receiving radio resource control (RRC) information elements including a measurement object having a synchronization signal/physical broadcast channel (SS/PBCH) block measurement time configuration (SMTC), receiving a RRC reconfiguration message including a handover command including a Primary Secondary Cell (PSCell) change from a source PSCell to a target PSCell during a Primary Cell (PCell) handover procedure from a source PCell to a target PCell, and performing measurements of the target PSCell in accordance with the SMTC. The source PCell is used for reference timing of the SMTC if the measurement object is configured by the source PCell on same frequency and subcarrier spacing of the target PSCell. The source PSCell is used for reference timing of the SMTC if the measurement object is configured by the source PSCell on same frequency and subcarrier spacing of the target PSCell.

Example 28 comprises the subject matter of any variation of any of example(s) 27, wherein one and only one of the source PCell or the source PSCell configures the SMTC of the measurement object on same frequency and subcarrier spacing of the target PSCell.

Example 29 comprises the subject matter of any variation of any of example(s) 27, either the source PCell or the source PSCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 can be merged.

Example 30 comprises the subject matter of any variation of any of example(s) 27 and 29, wherein the source PCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 cannot be merged.

Example 31 comprises the subject matter of any variation of any of example(s) 27 and 29, wherein the source PSCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 cannot be merged.

Example 32 comprises the subject matter of any variation of any of example(s) 27 and 29, wherein the source PSCell is used for reference timing of the SMTC only if using the source PCell fails if a first measurement object (MO1) is configured by the source PCell and a second measurement object (MO2) is configured by the source PSCell on same frequency and subcarrier spacing of the target PSCell, and if the MO1 and the MO2 cannot be merged.

Example 33 comprises the subject matter of any variation of any of example(s) 27 and 29-32, wherein the source PSCell is used for reference timing of the SMTC only if using the source PCell fails if a first measurement object (MO1) is configured by the source PCell and a second measurement object (MO2) is configured by the source PSCell on same frequency and subcarrier spacing of the target PSCell, and if the MO1 and the MO2 cannot be merged.

Example 34 comprises the subject matter of any variation of any of example(s) 27 and 29-32, wherein the source PSCell is used for reference timing of the SMTC only if using the source PCell fails if a first measurement object (MO1) is configured by the source PCell and a second measurement object (MO2) is configured by the source PSCell on same frequency and subcarrier spacing of the target PSCell, and if the MO1 and the MO2 cannot be merged.

Example 35 comprises the subject matter of any variation of any of example(s) 27 and 29-32, wherein the SMTC is assumed a fixed periodicity if the SMTC of the measurement object is not configured on same frequency and subcarrier spacing of the target PSCell.

Example 36 comprises the subject matter of any variation of any of example(s) 27 and 29-32, wherein the source PSCell is used for reference timing of the SMTC if the SMTC of the measurement object is not configured on same frequency and subcarrier spacing of the target PSCell.

Example 37 comprises the subject matter of any variation of any of example(s) 27 and 29-32, wherein source PSCell is used for reference timing of the SMTC only if using the source PCell fails if the SMTC of the measurement object is not configured on same frequency and subcarrier spacing of the target PSCell.

Example 38 comprises the subject matter of any variation of any of example(s) 27-37, wherein the handover procedure is from a source New Radio Dual Connectivity (NR-DC) configuration to a target NR-DC configuration.

Example 39 comprises the subject matter of any variation of any of example(s) 27-37, wherein the handover procedure is from a source E-UTRAN New-Radio Dual Connectivity (EN-DC) configuration to a target EN-DC configuration.

Example 40 comprises the subject matter of any variation of any of example(s) 27-39, wherein the SMTC of the measurement object is configured before reception of the RRC reconfiguration message.

Example 41 comprises the subject matter of any variation of any of example(s) 27-39, wherein the measurement object is received at the same time as the reception of the RRC reconfiguration message.

Example 42 is a user equipment (UE) configured to perform operations comprising receiving a synchronization signal/physical broadcast channel (SS/PBCH) block measurement time configuration (SMTC) for a target NR Primary Secondary Cell (PSCell) addition of a handover procedure from a source New Radio Stand Alone (NR-SA) configuration to a target E-UTRAN New-Radio Dual Connectivity (EN-DC) configuration. Wherein a target LTE primary cell (PCell) is used for reference timing if the SMTC is configured in a target cell information element targetCellSMTC-SCG.

Example 43 is a user equipment (UE) configured to perform operations comprising receiving a synchronization signal/physical broadcast channel (SS/PBCH) block measurement time configuration (SMTC) for a target NR Primary Secondary Cell (PSCell) addition of a handover procedure from a source New Radio Stand Alone (NR-SA) configuration to a target E-UTRAN New-Radio Dual Connectivity (EN-DC) configuration. Wherein a source NR primary cell (PCell) is used for reference timing of the SMTC if the SMTC for the target NR PSCell is configured in a target cell information element targetCellSMTC-SCG.

Example 44 is a user equipment (UE) configured to perform operations comprising receiving a synchronization signal/physical broadcast channel (SS/PBCH) block measurement time configuration (SMTC) for a target NR Primary Secondary Cell (PSCell) addition of a handover procedure from a source New Radio Stand Alone (NR-SA) configuration to a target E-UTRAN New-Radio Dual Connectivity (EN-DC) configuration. Wherein a source NR primary cell (PCell) is used for reference timing of the SMTC if the SMTC for the target NR PSCell is configured in a measurement object of radio resource control (RRC) information elements on same frequency and subcarrier spacing of the target NR PSCell.

Example 45 is a user equipment (UE) configured to perform operations comprising receiving a synchronization signal/physical broadcast channel (SS/PBCH) block measurement time configuration (SMTC) for a target NR Primary Secondary Cell (PSCell) addition of a handover procedure from a source New Radio Stand Alone (NR-SA) configuration to a target E-UTRAN New-Radio Dual Connectivity (EN-DC) configuration. Wherein a source NR primary cell (PCell) is used for reference timing of the SMTC if the target NR PSCell is configured in a measurement object of radio resource control (RRC) information elements, and if the SMTC of the measurement object is configured by the source NR PCell on same frequency and subcarrier spacing of the target NR PSCell. Wherein a target LTE PCell is used for reference timing of the SMTC if the SMTC for the target NR PSCell is not configured in a measurement object on same frequency and subcarrier spacing of the target NR PSCell.

Example 46 is a user equipment (UE) configured to perform operations comprising receiving a synchronization signal/physical broadcast channel (SS/PBCH) block measurement time configuration (SMTC) for a handover procedure from a source New Radio Stand Alone (NR-SA) configuration to a target E-UTRAN New-Radio Dual Connectivity (EN-DC) configuration including adding a target NR Primary Secondary Cell (PSCell). Wherein a source primary cell (PCell) is used for reference timing of the SMTC if the SMTC is configured in a measurement object, and if the SMTC is configured by the source PCell on same frequency and subcarrier spacing of the target NR PSCell. Wherein the SMTC is assumed a fixed periodicity if the SMTC is configured in the measurement object but not configured on same frequency and subcarrier spacing of the target NR PSCell.

Example 47 is a base station (BS). The baseband processor configured to perform operations comprising transmitting radio resource control (RRC) information elements to a user equipment (UE) including a measurement object having a synchronization signal/physical broadcast channel (SS/PBCH) block measurement time configuration (SMTC) and transmitting a handover command for a handover procedure including changing a source Primary Secondary Cell (PSCell) to a target PSCell or adding the target PSCell. Wherein the SMTC is used for the target PSCell change or addition, and a source primary cell (PCell) is used for reference timing of the SMTC.

Example 48 comprises the subject matter of any variation of any of example(s) 47, wherein the source PCell is used for reference timing of the SMTC if the measurement object is configured by the source PCell on same frequency and subcarrier spacing of the target PSCell and wherein a source PSCell is used for reference timing of the SMTC if the measurement object is configured by the source PSCell on same frequency and subcarrier spacing of the target PSCell.

Example 49 comprises the subject matter of any variation of any of example(s) 47-48, wherein the measurement object is configured by one and only one of the source PCell and a source PSCell on same frequency and subcarrier spacing of the target PSCell.

Example 50 is a base station (BS). The baseband processor configured to perform operations comprising transmitting radio resource control (RRC) information elements to a user equipment (UE) including a measurement object having a synchronization signal/physical broadcast channel (SS/PBCH) block measurement time configuration (SMTC) and transmitting a handover command for a handover procedure including a target Primary Secondary Cell (PSCell) change or addition. Wherein the SMTC is used for the target PSCell change or addition, and a target primary cell (PCell) is used for reference timing of the SMTC if the SMTC of the measurement object is not configured on same frequency and subcarrier spacing of the target PSCell.

Example 51 comprises an apparatus comprising means for executing any of the described operations of examples 25-26.

Example 52 comprises a machine readable medium that stores instructions for execution by a processor to perform any of the described operations of examples 25-26.

Example 53 comprises an apparatus comprising: a memory interface; and processing circuitry configured to: perform any of the described operations of examples 25-26.

Example 54 comprises a user equipment (UE) configured to execute any of the described operations of examples 25-26.

Example 55 comprises the subject matter of any variation of any of example(s) 1-54, wherein the measurement object is MeasObjectNR in NR system standards as provided by 3GPP technical specifications.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor, the baseband processor configured to perform operations comprising:

receiving a radio resource control (RRC) information element including a measurement object having a synchronization signal/physical broadcast channel (SS/PBCH) block measurement time configuration (SMTC);

receiving an RRC reconfiguration message including a handover command for a handover procedure including a Primary Secondary Cell (PSCell) change from a source PSCell to a target PSCell during a Primary Cell (PCell) handover procedure from a source PCell to a target PCell, wherein the RRC reconfiguration message is received concurrently with the measurement object; and performing a measurement for the target PSCell in accordance with the SMTC, wherein the SMTC is assigned a fixed default periodicity, in response to the SMTC of the measurement object being not configured on the same frequency and subcarrier spacing of the target PSCell.

2. The baseband processor of claim 1, wherein the fixed default periodicity is 5 ms.

3. The baseband processor of claim 1, wherein either the source PCell or the source PSCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 are determined to be mergeable.

4. The baseband processor of claim 1, wherein the source PCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 are determined to be non-mergeable.

5. The baseband processor of claim 1, wherein the source PSCell is used for reference timing of the SMTC if a first measurement object (MO1) is configured by the source PCell and a second measurement object (MO2) is configured by the source PSCell on same frequency and subcarrier spacing of the target PSCell, and if the MO1 and the MO2 are determined to be non-mergeable.

6. The baseband processor of claim 1, wherein the source PSCell is used for reference timing of the SMTC only if using the source PCell fails if a first measurement object (MO1) is configured by the source PCell and a second measurement object (MO2) is configured by the source PSCell on same frequency and subcarrier spacing of the target PSCell, and if the MO1 and the MO2 are determined to be non-mergeable.

7. The baseband processor of claim 1, wherein the source PCell is used for reference timing of the SMTC if the SMTC of the measurement object is not configured on same frequency and subcarrier spacing of the target PSCell.

8. The baseband processor of claim 1, wherein the target PCell is used for reference timing of the SMTC if the SMTC of the measurement object is not configured on same frequency and subcarrier spacing of the target PSCell.

9. The baseband processor of claim 1,
wherein the source PCell is used for reference timing of the SMTC if the measurement object is configured by the source PCell on the same frequency and subcarrier spacing of the target PSCell; and
wherein the source PSCell is used for reference timing of the SMTC if the measurement object is configured by the source PSCell on the same frequency and subcarrier spacing of the target PSCell.

10. The baseband processor of claim 1, wherein the source PSCell is used for reference timing of the SMTC if the SMTC of the measurement object is not configured on the same frequency and subcarrier spacing of the target PSCell.

11. The baseband processor of claim 1, wherein source PSCell is used for reference timing of the SMTC only if using the source PCell fails if the SMTC of the measurement object is not configured on same frequency and subcarrier spacing of the target PSCell.

12. The baseband processor of claim 1, wherein handover procedure is from a source New Radio Dual Connectivity (NR-DC) configuration to a target NR-DC configuration.

13. The baseband processor of claim 1, wherein the handover procedure is from a source E-UTRAN New-Radio Dual Connectivity (EN-DC) configuration to a target EN-DC configuration.

14. The baseband processor of claim 1, wherein the SMTC of the measurement object is configured before reception of the RRC reconfiguration message.

15. A baseband processor, comprising:
a memory configured to store instructions; and
a processor, coupled to the memory and when executing the instructions, configured to:
send radio resource control (RRC) information elements including a measurement object having a synchronization signal/physical broadcast channel (SS/PBCH) block measurement time configuration (SMTC);
send a handover command for a handover procedure including changing a source Primary Secondary Cell (PSCell) to a target PSCell or adding the target PSCell, wherein a source primary cell (PCell) is used for reference timing of the SMTC, in response to the measurement object being configured by the source PCell on the same frequency and subcarrier spacing of the target PSCell; and
perform a measurement for the target PSCell in accordance with the SMTC,
wherein the SMTC is assigned a fixed default periodicity, in response to the SMTC of the measurement object being not configured on the same frequency and subcarrier spacing of the target PSCell.

16. The baseband processor of claim 15, wherein the fixed default periodicity is 5 ms.

17. The baseband processor of claim 15, wherein the measurement object is received concurrently with the handover command.

18. The baseband processor of claim 15,
wherein the source PSCell is used for reference timing of the SMTC, in response to the measurement object being configured by the source PSCell on the same frequency and subcarrier spacing of the target PSCell.

19. A method, comprising:
receiving a radio resource control (RRC) information element including a measurement object having a synchronization signal/physical broadcast channel (SS/PBCH) block measurement time configuration (SMTC);
receiving a handover command including changing a source Primary Secondary Cell (PSCell) to a target PSCell or adding the target PSCell, wherein the source PSCell is used for reference timing of the SMTC, in response to the measurement object being configured by the source PSCell on the same frequency and subcarrier spacing of the target PSCell; and
performing a measurement for the target PSCell in accordance with the SMTC,
wherein the SMTC is assigned a fixed default periodicity, in response to the SMTC of the measurement object being not configured on the same frequency and subcarrier spacing of the target PSCell.

* * * * *